United States Patent [19]

Kirchweger et al.

[11] 4,141,427
[45] Feb. 27, 1979

[54] MOTOR VEHICLE WITH A NOISE SUPPRESSING ENGINE ENCAPSULATION

[75] Inventors: Karl Kirchweger; Heinz Fachbach; Gerhard Thien, all of Graz, Austria

[73] Assignee: Hans List, Graz, Austria

[21] Appl. No.: 830,193

[22] Filed: Sep. 2, 1977

[30] Foreign Application Priority Data

Sep. 3, 1976 [AT] Austria ................................ 6567/76
Jun. 27, 1977 [AT] Austria ................................ 4552/77

[51] Int. Cl.² ............................................ B62D 25/00
[52] U.S. Cl. ............................. 180/69 R; 180/89.14; 181/204
[58] Field of Search ............... 180/54 A, 69 R, 69 C, 180/89.13, 89.14, 89.15, 89.16, 89.17; 181/204, 198; 123/198 E

[56] References Cited

U.S. PATENT DOCUMENTS

| | | | |
|---|---|---|---|
| 1,849,872 | 3/1932 | Gurney | 180/54 A |
| 1,882,319 | 10/1932 | Gurney | 180/54 A |
| 2,502,622 | 4/1950 | Harris | 180/89.14 |
| 2,613,754 | 10/1952 | Van Doorne | 180/69 R X |
| 3,112,810 | 12/1963 | Nallinger | 123/198 E X |
| 3,288,237 | 11/1966 | Muller | 180/54 A |
| 3,693,602 | 9/1972 | Thein et al. | 181/204 X |
| 3,882,951 | 5/1975 | Conley | 180/54 A X |

*Primary Examiner*—Joseph F. Peters, Jr.
*Assistant Examiner*—Milton L. Smith
*Attorney, Agent, or Firm*—Watson, Cole, Grindle & Watson

[57] ABSTRACT

A motor vehicle with an internal combustion engine supported on two longitudinal subframe beams of the vehicle and provided with a noise-suppressing engine encapsulation consisting of a hood supported by the vehicle frame and including substantially perpendicular longitudinal and transverse walls, and a movable cover part on the upper rims of the walls, a front end wall situated in front of the engine reaching from the bottom rims of the beams to above a passage opening for the engines cooling water, a rear end wall arranged behind the gearbox extending downwardly from the top edges of the beams, and a middle transverse wall extending behind the engine from the top edges of the beams over an air intake pipe and exhaust pipes, two longitudinal side walls extending from the front end wall to the middle transverse wall and an oil sump cover part provided underneath the beams for completing an allround encapsulation assembly.

17 Claims, 10 Drawing Figures

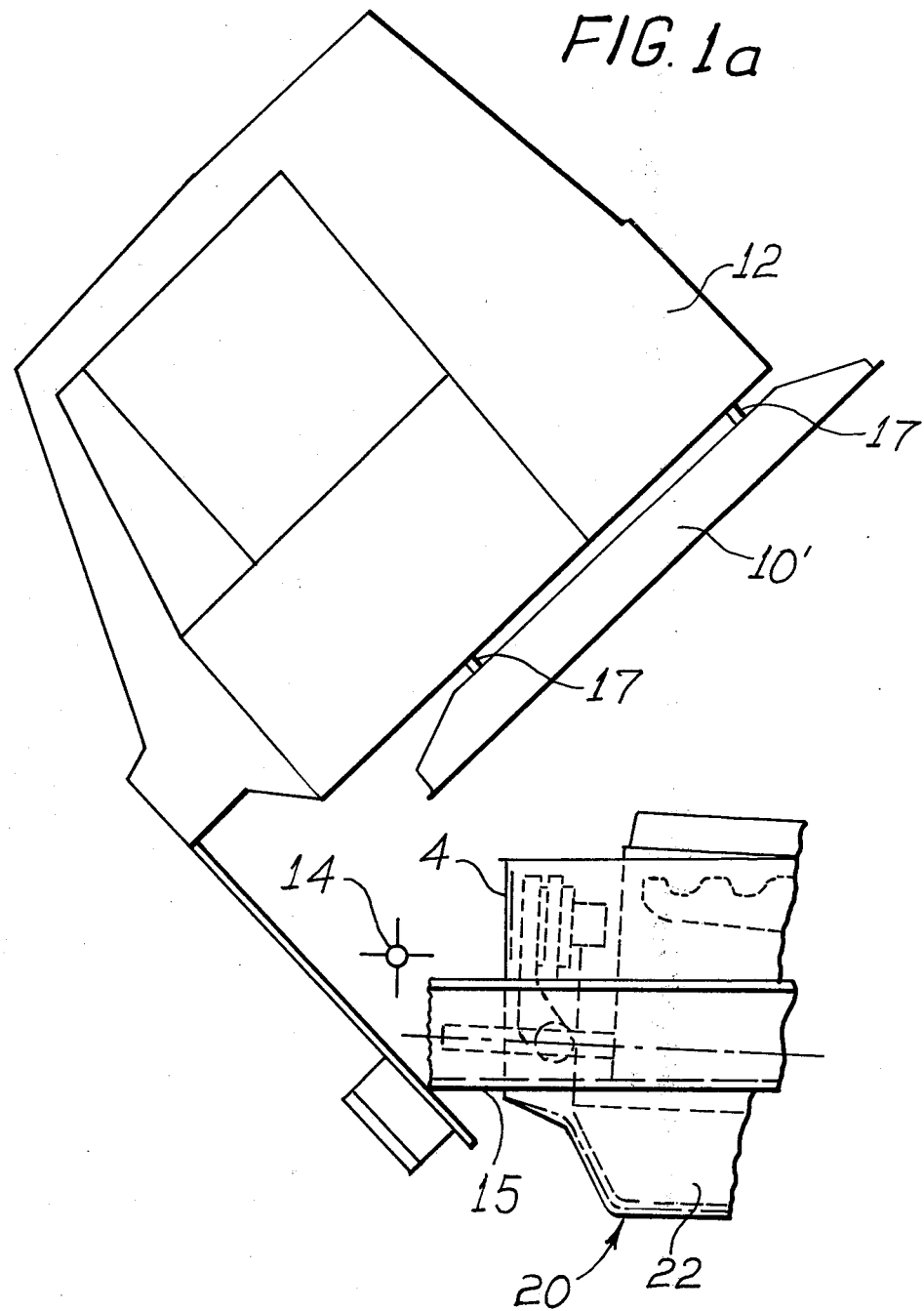

MOTOR VEHICLE WITH A NOISE SUPPRESSING ENGINE ENCAPSULATION

BACKGROUND OF THE INVENTION

This invention relates to a motor vehicle of the kind comprising an internal combustion engine with a gearbox and air intake and exhaust pipes connected thereto, the engine being provided with a noise-suppressing encapsulation, and supported on the two longitudinal subframe members of the vehicle, and having a fan-cooled, water radiator, the noise-suppressing encapsulation of the engine consisting of substantially perpendicular, longitudinal and transverse wall panels and cover parts fitted detachably at the edges thereof.

DESCRIPTION OF THE PRIOR ART

In some previously proposed arrangements of this kind the noise-suppressing encapsulation of the internal combustion engine consists of shell panels which are mounted in acoustically insulating, spaced relation to the engine and, at least partly, secured in resonance-suppressing fashion directly to the engine. It has also been proposed to provide a first group of shell parts which are secured directly to the engine in resonance-suppressing manner with suitable provisions for the passage therethrough of the various pipelines and other engine connections. A second group of shell parts is readily detachably secured in acoustically insulated manner to the parts of the first group; these secondary parts cover those areas of the engine or its ancillary units which require regular maintenance and may include parts extending over the cylinder head, a pair of shell parts covering the lateral walls of the crankcase including a provision to cover an injection pump, and possibly a final shell part underneath the oil sump to seal the lower shell region of the crankcase.

This type of encapsulation has the advantage of adding comparatively little to the overall weight and volume of the non-encapsulated power unit. Encapsulations of this kind are acoustically highly efficient even without the provision of a sound-absorbing lining at their interior wall faces, and as a general rule they are cooled by their own fan to prevent undue heat build-up.

However, in spite of all the advantages appertaining to such engine-mounted encapsulations, there are certain problems with regard to the accommodation and sealing of the encapsulation which tend to arise, for example in the special case of an engine-gearbox unit, in the region between the engine and the vehicle frame or chassis, and also with regard to the engine bearings on the flywheel side. Other problems occur in the fitting of noise-suppressingly encapsulated engines of this kind in motor vehicles in the event of the engine or gearbox requiring major repair or maintenance work since the encapsulation once fitted in the vehicle cannot, or only with great difficulty, be dismantled without stripping the entire power unit.

In a motor vehicle of the kind specified it has already also been proposed to use, at least partly, component parts of the vehicle chassis, sub-frame or body which are situated in the vicinity of the engine or engine gearbox unit, to make up the noise-suppressing encapsulation or shell, and to keep the interior of this shell clear of the heated cooling air-flow flowing away from the radiator. By comparison with motor vehicles which comprise noise-suppressing encapsulations supported elastically by the engine itself, such an arrangement has the advantages of a considerable reduction in weight and corresponding cost economy. Another advantage can be seen in the resulting much simplified assembly and fitting conditions which considerably simplify care and maintenance of the engine and its ancillary units. As compared with known arrangements wherein the total volume of heated cooling air flows away from the radiator through the noise-suppressing encapsulation, this last mentioned arrangement combines the same space requirement with much improved noise suppression efficiency, or conversely, requires considerably less space for the same acoustic effect because it dispenses with large silencer means for the large volumes of cooling air.

On the other hand, this arrangement has the serious drawback that the provisions for achieving the desired noise-suppression effect must be applied in part to the engine and in part to the body or subframe, or chassis of the vehicle, for which reason the manufacture or production of such an encapsulation is more difficult than for an encapsulation which is carried by the engine itself.

In view of the comparatively strong relative movement of the three main parts or units which are used in this earlier arrangement to support the encapsulation components, namely of the engine, subframe or chassis and car body, it is extremely difficult to seal the individual parts of the encapsulation relative to one another and the useful service life of the sealing means used for this purpose is rather limited. The subframes of trucks tend to twist very strongly when the vehicle is driven over irregular surfaces and such twisting effects are very noticeable in the chassis region of engine and gearbox so that the same twisting or torsional stress would be imposed on any encapsulation part supported in this region. However, the existing arrangement does not include any provisions for keeping such strains and stresses within acceptable limits by making the relevant parts of the encapsulation of special design or form. Moreover, the engine gearbox unit can be made accessible only by a somewhat awkward and complicated stripping of parts of the engine encapsulation.

SUMMARY OF THE INVENTION

It is the aim of the present invention to provide an engine encapsulation which is highly efficient with regard to noise suppression but avoids the disadvantages of the above-described earlier arrangements.

According to this invention for a motor vehicle of the kind referred to at the beginning a noise-suppressing engine encapsulation is provided consisting of a hood supported by the vehicle frame and comprising substantially perpendicular longitudinal and transverse walls, a movable cover part on the upper rims of such walls, and a frontal and a rearward transverse end wall, the end walls extending between and up to the beams which have a closed profile in the region of the transverse end walls, the frontal end wall situated in front of the engine reaching from the bottom rims of the beams to above a passage opening for cooling water, the rear end wall arranged behind the gearbox extending downwardly from the top edges of the beams, further being provided a transverse wall extending behind the engine from the top edges of the beams over the air intake pipe and the exhaust pipes, the two longitudinal side walls extending from the frontal end wall to the middle transverse wall, and in addition to the top cover part closing the top rims of the side walls, the frontal and the middle transverse wall, being a further cover part supported on the beams and extending from the middle transverse wall to the rear end wall, and for completion of the allround encapsulation assembly underneath the beams being further provided an oil sump over part.

Such an arrangement deliberately refrains from making use of any parts of the car body for noise suppression thereby eschewing the potential drawbacks of such a situation. Furthermore, no part of the engine encapsulation is secured to the engine itself so that the formerly required body resonance suppressing connections and mountings may be safely dispensed with. The component parts of the encapsulation according to the present invention which are preferably plain, but may also be coated or clad, sheet metal parts, or consist of a suitable plastics material are either connected to one another or to the subframe beams, e.g. by screw bolts, which provides comparatively easy assembly conditions.

The features of the present invention which are believed to be novel are set forth with particularity in the appended claims. The present invention together with further objects and advantages thereof, may be best understood by reference to the following description, taken in connection with the accompanying drawings.

DESCRIPTION OF THE DRAWINGS

FIG. 1a is a partial view of another embodiment;

FIG. 6 the corresponding plan view of FIG. 5 while

DESCRIPTION OF THE PREFERRED EMBODIMENTS

Figure 1:
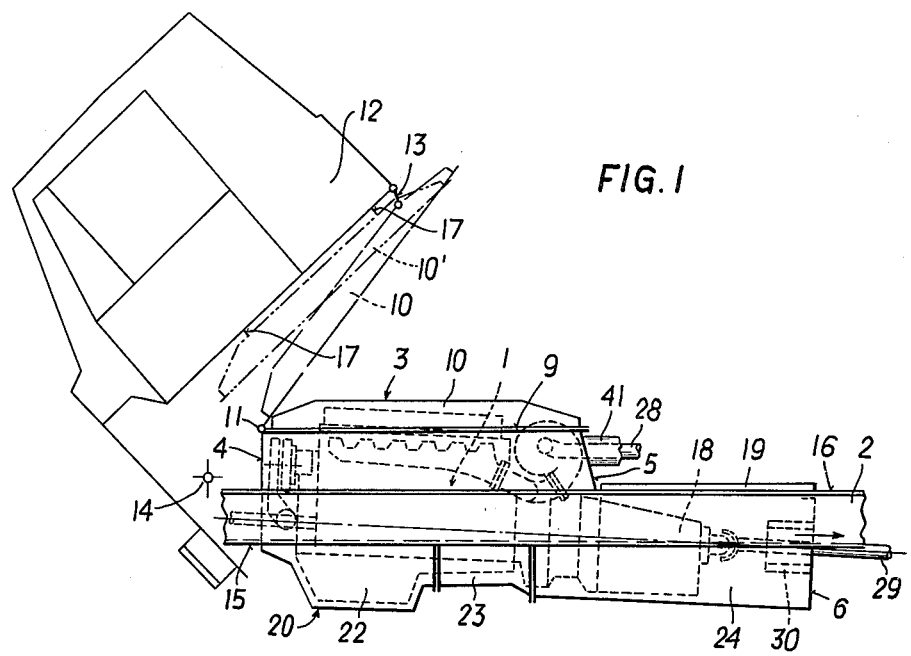
FIG. 1 is an overall view of one embodiment of the invention.

In the drawings, like parts are given the same references in all Figures, and all parts of a motor vehicle which are not essential for the purposes of understanding this invention have been omitted from the drawings.

FIG. 1 shows a six-cylinder in-line combustion engine 1 and two subframe longitudinal beams 2 of a motor vehicle on which the engine is mounted and secured in a suitable, not specifically illustrated fashion. The engine 1 is surrounded by an encapsulation generally designated 3 which is supported on the longitudinal subframe beams 2.

The encapsulation 3 comprises a transverse end wall 4 forwardly of the engine, viewing in the direction of driving and a further transverse wall 5 situated behind the engine and a transversely extending end wall 6 behind the gearbox 18. All of these transverse walls are arranged between the subframe beams 2. In the upward direction, the transverse wall 4 extends from the bottom edge 15 of the beams 2 above the level of a passage opening 27' for the cooling water (see FIG. 3) while the transverse wall 5 extends from the top edge 16 of the beams 2 right over an intake pipe 27 and an exhaust pipe 28. The transverse wall 6 extends from the bottom edge 15 to the top edge 16 of the beams 2. The assembly 3 further comprises a pair of longitudinal side walls 7 and 8 extending from the front end wall 4 to the intermediate transverse wall 5 behind the engine. In the upward direction these side walls 7 and 8 extend above the beams 2 and co-operate with the transverse walls 4 and 5 to present a level sealing surface 9 for a top cover part 10.

The top cover part 10 is pivotally mounted by means of a hinge 11 on the transverse wall 4. In FIG. 1 the top cover 10 is shown resting on the sealing surface 9 but is also shown in its raised position when it is pivoted upwardly together with a tiltable driver's cabin 12. The connection between the driver's cabin and the top cover part 10 of the encapsulation is made by movable or flexible elements such as chain links 13. When the driver's cabin 12 is tilted forwardly about a pivot axis 14, the top cover part 10 is carried by the flexible links 13 to assume the position shown in FIG. 1. Likewise, when the driver's cabin is returned to its normal position, the top cover part 10 returns to seat on the sealing surface 9. It is advisable to provide a soft sealing device for the top cover 10 and also, where desired, elastic spring means may be provided to urge the part 10 firmly against the seating surface 9 as soon as the driver's cabin has been restored to its normal position.

A different form of execution of the top cover is shown in FIG. 1a. The cover part 10' is secured to the driver's cabin 12 by means of bolts 17 with the result that the cover part 10' will move on the tilting movement of the cabin 12. With this form of execution of the cover part 10' it is advisable to provide extremely soft sealing means at the seating surface 9, or elastic mounting or securing means.

In the region of the gearbox 18, the encapsulation 3 is sealingly closed between the transverse wall 5 behind the engine 1 and the transverse end wall 6 behind the gearbox 18 by a cover part 19 resting on the beams 2.

The underside of the encapsulation 3 is closed by a dished sump cover generally designated 20 which is sealed relative to the beams 2, and sealed at least also relative to the frontal end wall 4 forwardly of the engine and the rear end wall 6 behind the gearbox.

In the region of a front axle 21 of the vehicle, this sump cover part 20 is split twice transversely of its length to present separate sump cover elements 22, 23 and 24 to enable the individual sump cover elements 22 and 24 which are situated respectively in front of and behind the front axle 21 to be removed easily. Moreover, since the plane of the second split or division 25 (FIG. 2) is in the region of the flywheel, there is also a middle sump cover element 23 affording ready access to the starter situated therebeneath. Moreover, by virtue of such subdivision into individual component elements, the dished sump cover 20 can readily follow any twisting or torsional movements of the beams 2 when the vehicle is driven over obstacles, without being subjected to major strains and stresses.

The above-described provision of the two cover parts 10 and 19 on the topside of the encapsulation 3 provides the same advantages of reducing strains and stresses as the multi-part configuration of the sump cover 20. The earlier mentioned very soft sealing means for the top cover 10 also provide the advantage that relative sliding displacement of the supporting parts resulting from twisting of the vehicle frame will not be transmitted to the top cover part.

The frontal end wall 4 and the end wall 6 behind the gearbox 18 are not affected by any torsional movement or twisting. The transverse wall 5 behind the engine 1 is only slightly affected by such movements, or not at all, and it may be in the form of a plane or flat plate or panel. The side walls 7 and 8 as well as the top cover 19 above the gearbox 18 are shallow parts which can suffer a certain amount of torsional movement without giving rise to major stresses.

Figure 2:
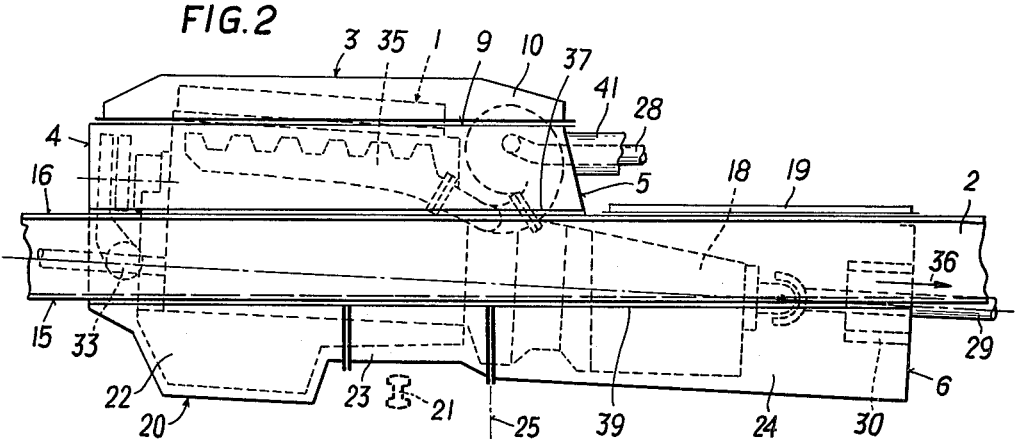
FIG. 2 is a side view of a modified form of execution.
Figure 3:
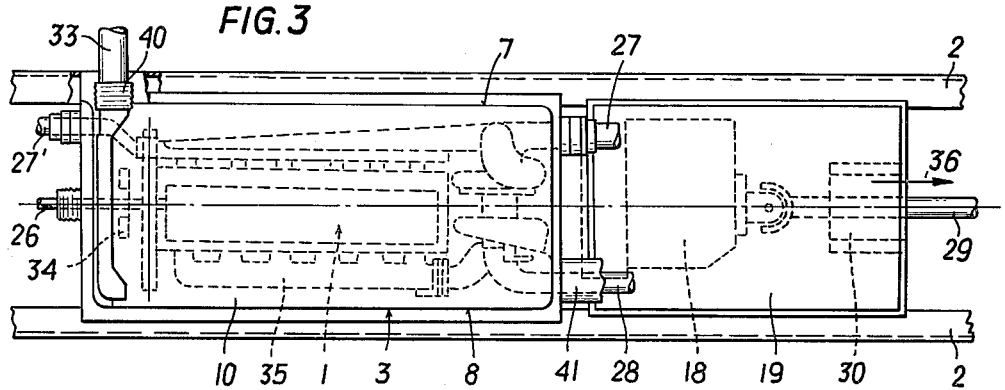
FIG. 3 the corresponding plan view of FIG. 2.
Figure 4:
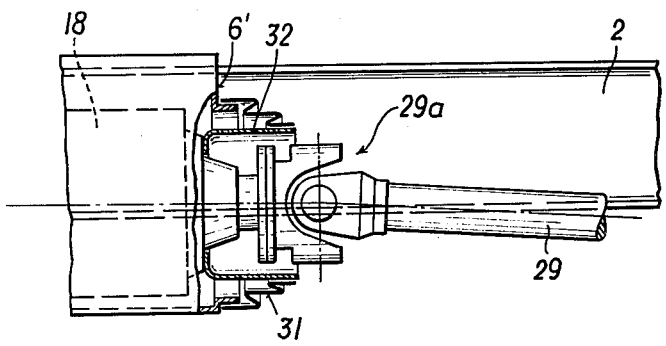
FIG. 4 shows details on a larger scale of a modified embodiment.

The arrangement of the top cover 10 according to FIGS. 2 to 4 differs from that according to FIG. 1 chiefly in that the top cover 10 which closes the topside of the space defined by the end walls 4 and 5 and the side walls 7 and 8, is not pivotable or hinged but can be freely lifted off the suppporting walls.

The passage openings for cooling water pipes, main and auxiliary drives, air intake and exhaust pipes, accelerator cable or linkage, hydraulic-pneumatic and fuel pipes, are all provided in the transverse walls 4, 5 and 6, leaving the top cover parts 10 and 19 as well as the sump cover 20 entirely free of such openings so that these may be of correspondingly simple form and can be easily assembled and fitted on the vehicle.

Of these various passage openings having associated sealing means, FIGS. 2 to 3 of the drawings illustrate in the front wall 4, the drive shaft 26 connection to the radiator or cooling fan (not shown) and the passage opening 27' for the cooling water. The middle wall 5 contains passages for the air intake pipe 27 and the exhaust pipe 28. The latter is surrounded by a silencer device 41 secured to the side wall for the outflow of cooling air from the encapsulation. A suitable sound-absorbing but air permeable material is provided between the exhaust pipe 28 and the outer wall of this silencer. A transmissions shaft 29 passes through the end wall 6 behind the gearbox 18 with a silencer 30 secured to the inside of this end wall 6 substantially concentric to and surrounding this shaft 29.

In a modified form of execution shown in FIG. 4, the transverse end wall 6' is arranged very closely behind the gearbox 18 and is elastically sealed relative to the shaft 29 by means of an elastic sealing boot or skirt 31 which co-acts with a cup-like and cylindrical guide member 32 secured to the gearbox 18.

Referring again to FIGS. 2 and 3, cooling air is admitted into the interior of the encapsulation 3 through a pair of pipes 33 which pass through the beams 2 in regions thereof which are subject to a minimum of stress and load. These air intake pipes 33 extend into the interior of the encapsulation and are connected thereto by means of rubber skirts 40 to permit relative movement of the parts. A fan 34 is provided within the encapsulated space 3 to conduct cooling air over the walls of the engine and especially over exhaust manifold 35. That part of the cooling airflow which sweeps only over the comparatively cooler engine parts is subsequently conducted over the gearbox 18 whereafter this part of the airflow emerges in the direction of arrow 36 through the silencer 30. In other words, the part of the cooling airflow which makes contact with the hot parts of the exhaust system is not conducted over the gearbox but leaves the encapsulated space forwardly of this gearbox through the silencer 41.

The silencer 30 through which the cooling airflow is discharged to the outside is arranged so low down that it partly extends into the rear part 24 of the sump cover 20.

Figure 7:
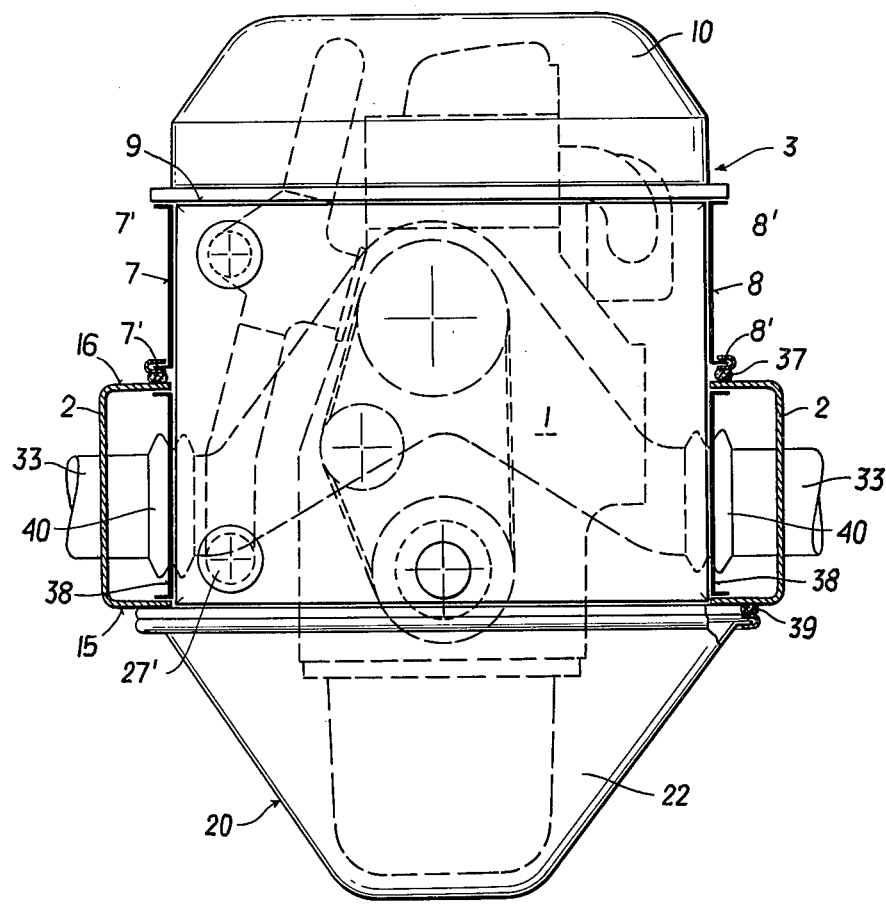
FIG. 7 is a view in the direction of arrow VII in FIG. 6 to a larger scale.
Figure 5:
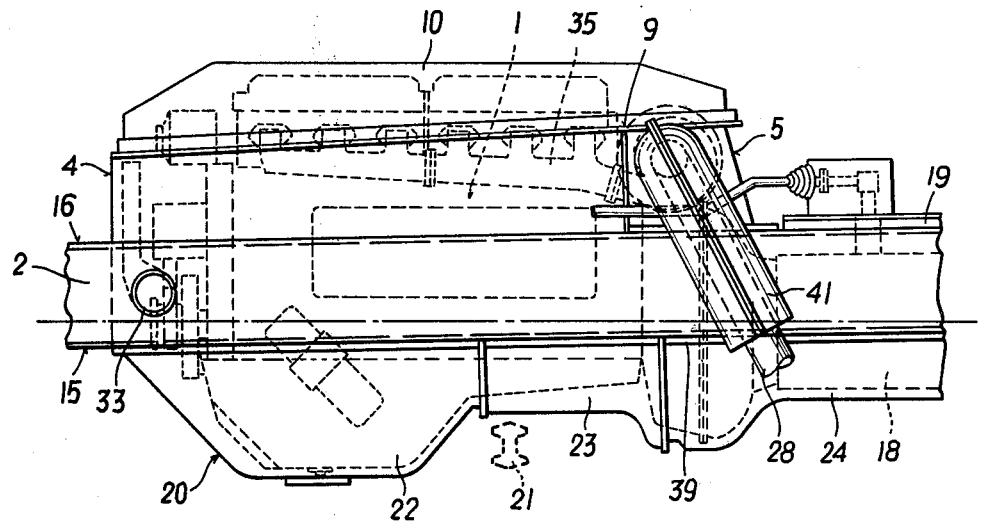
FIG. 5 is a side view of a further example of execution.
Figure 6:
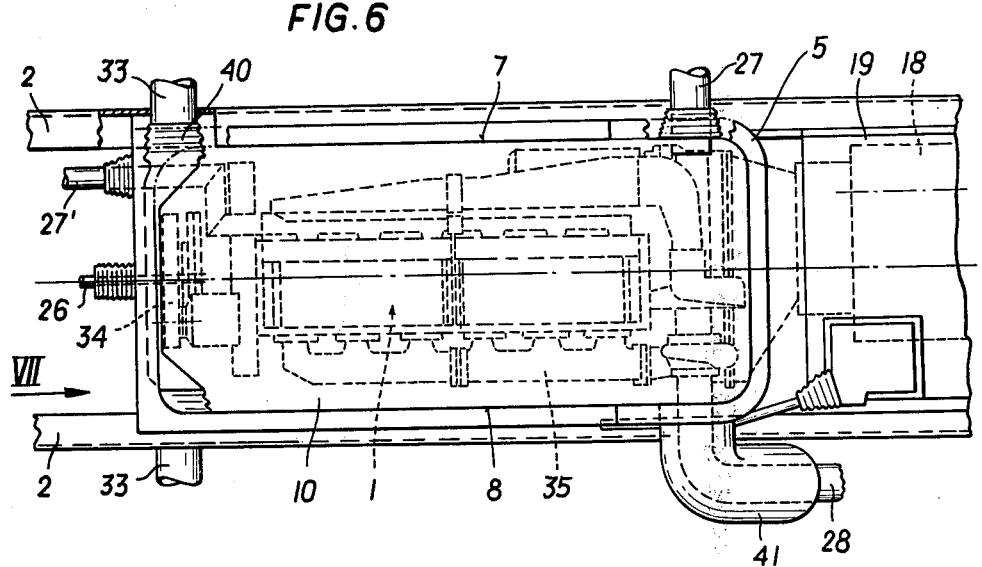

In the arrangement shown in FIGS. 5 to 7, the sealing engagement, or seating surface 9 which is presented jointly by the frontal end wall 4, the rear transverse wall 5 and the side walls 7 and 8, slopes upwardly in the rearward direction, (viewed in the sense of forward driving of the vehicle) and this permits the air-intake pipe 27 and the exhaust pipe 28 to be conducted laterally out of the encapsulated space without obstructing access to the forwardly situated engine parts. Accordingly, the front part of the top cover 10 is higher than the rear part thereof.

The transverse wall 5 is wrapped, or drawn laterally U-fashionwise around the engine 1 and the lateral outlets for the intake pipe 27 and the exhaust 28 are arranged in this part, thereby permitting ready removal of the longitudinal side walls 7, 8 without any need for disconnection of pipes or the like.

For preference, the transverse walls as well as the longitudinal side walls of the encapsulation are made of plain, i.e. uncoated or unlined sheet metal. As shown in FIG. 7, the walls 7 and 8 each comprise limbs, or flanges, 7', 8', respectively to provide, on the one hand, the plane and level seating and sealing surface 9 for the top cover part 10, and on the other hand, bear against the beams 2 with the interposition of suitable sealing means 37. In the region of the encapsulation 3 the beams 2 are covered by filler strips 38 which prevent sound transmission along the beams and thus complete the encapsulation.

The parts 22, 23 and 24 of the sump cover 20 are also secured to the underside of the beams 2 with the interposition of suitable sealing means 39.

Figure 8:
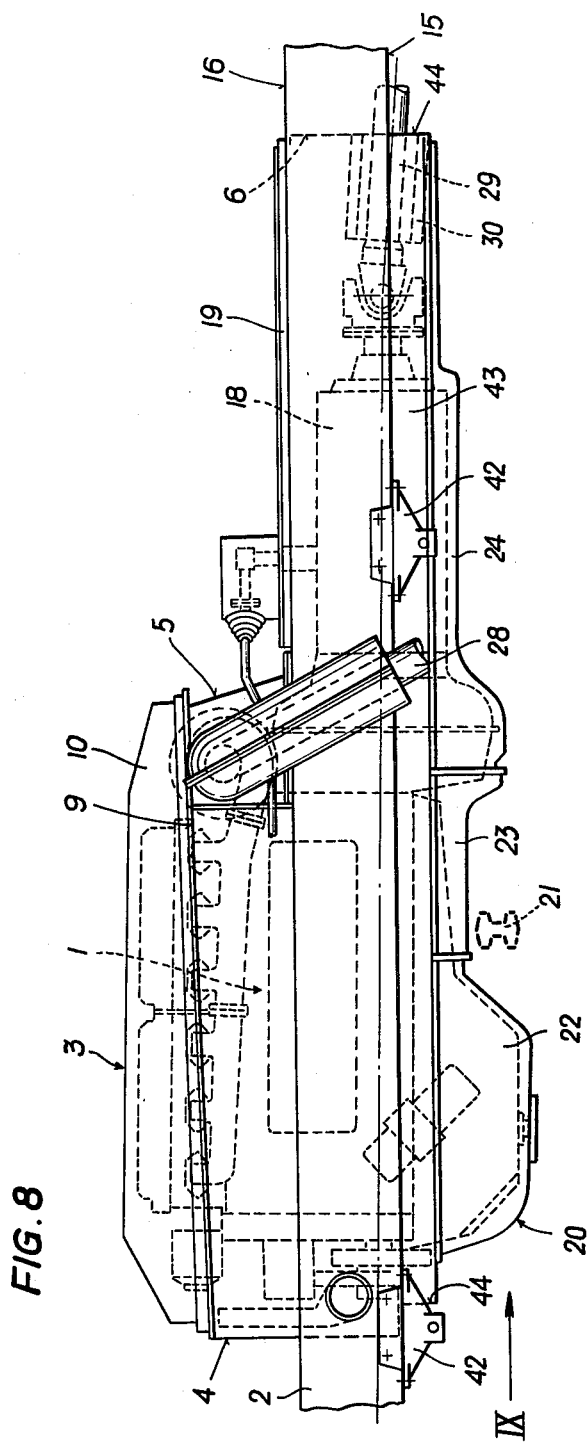
FIG. 8 is a side view of a further embodiment.
Figure 9:
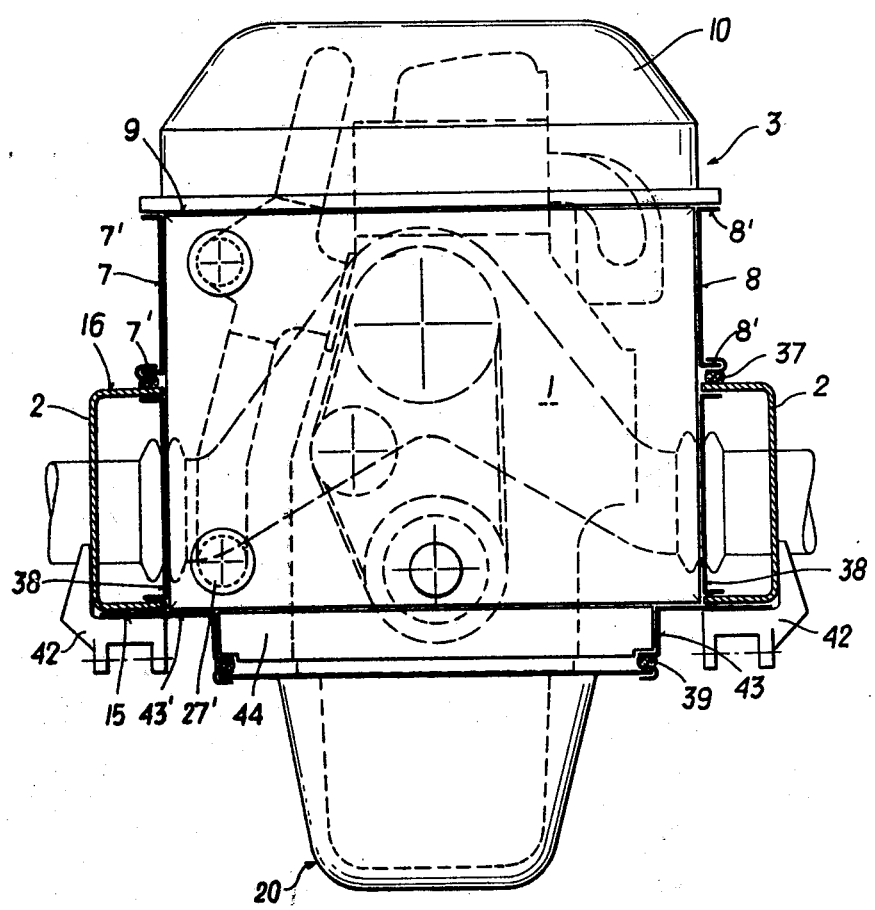
FIG. 9 is a corresponding enlarged view in the direction of arrow IX in FIG. 8.

In the further arrangement shown in FIGS. 8 and 9 the encapsulation 3 is closed on the underside by means of a sump part generally designated 20 in sealing engagement with the sealing strips 43 with transverse or cross-elements 44 and the interposition of sealing means 39. The outwardly angled parts 43' of the strips 43 are clamped firmly between the undersides of the beams 2 and front axle spring mounting blocks 42 are secured to the latter. In the transverse direction the strips 43 are completed by the cross parts 44 which may also be extensions of the transverse walls 4 and 6.

We claim:

1. A motor vehicle comprising a vehicle frame which includes two longitudinal subframe beams having top and bottom rims; an internal combustion engine mounted on and between said subframe beams; a gearbox with transmission shaft connected to said engine and extending away therefrom between said beams; air intake and exhaust pipes connected to said engine and extending away therefrom between said beams; a fan-cooled water radiator connected to said engine; and a noise-suppressing engine encapsulation enclosing said engine, said encapsulation comprising a first transverse end wall mounted between said beams and in front of said engine so as to extend from the bottom rims of said beams to upwardly of said top rims to form a sealing edge; a second transverse end wall mounted between said beams and behind said gearbox so as to extend from the top rims of said beams to below said bottom rims, said second transverse end wall including an opening for a gearbox transmission shaft; longitudinal side walls positioned to connect said first and second transverse end walls, said side walls being substantially perpendicular to said end walls; a third transverse wall mounted between said beams and behind said engine and extending from the top rims of said beams upwardly there-above to form a sealing edge, said side walls also connecting said first transverse end wall with said third transverse wall and having sealing edges connecting the sealing edges of said first and third transverse end walls; a movable cover part for enclosing the sealing edges of said first and third transverse walls and said side walls; a cover part extending between said side walls and connecting the lowermost portion of said third transverse wall with the uppermost portion of said second transverse end wall; and an oil sump cover means extending between said side walls and for connecting the lowermost portion of said first transverse end wall and the lowermost portion of said second transverse end wall.

2. The motor vehicle of claim 1 wherein at least one pair of opposed sealing strips is mounted beneath each of said subframe beams to extend downwardly therefrom, with each strip being shaped to provide a supporting surface for an opposite transverse side of said oil sump cover means.

3. The motor vehicle of claim 2 wherein axle spring mounted blocks are positioned beneath each of said subframe beams, and wherein each of said pair of sealing strips has an end clamped between a respective subframe beam and mounting block.

4. The motor vehicle of claim 2 wherein a cross element is positioned to extend transversely between, and be supported by, each pair of opposed sealing strips.

5. The motor vehicle of claim 4 wherein each cross element is formed as part of a transverse wall.

6. The motor vehicle of claim 2 wherein each said sealing strip has a central portion and two perpendicularly arranged end portions connected to the opposite ends of each central portion and so as to extend in opposite directions, each said central portion of each sealing strip being positioned between said subframe beams and having a portion extending parallel to the longitudinal direction of the adjacent subframe beam.

7. The motor vehicle of claim 1 wherein said oil sump cover part is positioned to be in sealing engagement with the underside of said subframe beams, and wherein said first transverse wall has a bottom edge situated in front of said engine and said second transverse wall has a bottom edge situated behind said gearbox.

8. The motor vehicle of claim 1 wherein said first transverse end wall includes an opening through which a cooling water conduit means passes to said radiator, and wherein said third transverse wall includes openings through which said air intake and exhaust pipes pass.

9. The motor vehicle of claim 1 wherein said third transverse wall has a generally U-shaped cross-section.

10. The motor vehicle of claim 1 wherein said longitudinal side walls include openings for said air intake and exhaust pipes, and wherein said first transverse end wall includes an opening through which a cooling water conduit means passes to said radiator.

11. The motor vehicle of claim 1 including a tiltable driver's cabin, and wherein said movable cover part is connected to said cabin.

12. The motor vehicle of claim 11 wherein said movable cover part is fixedly connected to said cabin to be in a fixed spaced relation therewith.

13. The motor vehicle of claim 11 wherein said movable cover part is flexibly connected at one end to said cabin and pivotably connected to said first transverse end wall at the opposite end so as to be jointly raisable with the tilting of the cabin.

14. The motor vehicle of claim 13 wherein spring means are connected to said movable cover part to urge said cover part into engagement with the sealing edges of said first transverse end wall, said third transverse wall and said longitudinal side walls when said driver's cabin is in its non-tilted position.

15. The motor vehicle of claim 1 wherein said motor vehicle includes a front axle positioned below and transversely to the longitudinal direction of said subframe beams, and wherein said oil sump cover part is divided into three sections, each positioned longitudinally of the next, and wherein the transverse intersection between two of said sections is near said front axle.

16. The motor vehicle of claim 1 wherein said gearbox transmission shaft has a cooling air outlet silencer positioned concentrically therearound, said silencer being at least partially within said encapsulation.

17. The motor vehicle of claim 1 wherein said motor vehicle includes a universal joint connected to an output shaft and wherein said second transverse end wall is positioned between the gearbox and said universal joint, said second transverse end wall being elastically sealed relative to a tubular guide tube positioned around said joint.

* * * * *